United States Patent [19]

Braun

[11] 4,432,837

[45] Feb. 21, 1984

[54] SOLVENT RECOVERY PROCESS

[75] Inventor: Willy Braun, East Brighton, Australia

[73] Assignee: Dulux Australia Ltd., Victoria, Australia

[21] Appl. No.: 397,693

[22] Filed: Jul. 13, 1982

Related U.S. Application Data

[63] Continuation-in-part of Ser. No. 176,760, Aug. 11, 1980, abandoned.

[30] Foreign Application Priority Data

Aug. 10, 1979 [AU] Australia .............................. PD9981

[51] Int. Cl.$^3$ ............................................... B01D 3/34
[52] U.S. Cl. ........................................ 203/37; 203/95; 210/696; 210/766; 210/774; 528/500
[58] Field of Search .............. 159/165, 47 R, 47 WL; 203/36, 41, 95, 96, 37; 210/696, 698, 737, 751, 774, 770, 766; 528/500, 501

[56] References Cited

U.S. PATENT DOCUMENTS

| 1,990,625 | 2/1935 | Walter et al. ........................ 260/102 |
| 3,337,422 | 8/1967 | Colton .................................... 203/36 |
| 3,553,156 | 1/1971 | Anolick et al. .................... 159/47 R |
| 3,583,967 | 6/1971 | Hattori et al. ...................... 528/500 |
| 3,707,443 | 12/1972 | Brown, Jr. ............................. 203/96 |
| 3,763,016 | 10/1973 | Hair ....................................... 203/95 |
| 3,848,027 | 11/1974 | Forbess et al. ...................... 528/500 |
| 3,929,586 | 12/1975 | Slikkers, Jr. .......................... 203/96 |
| 3,959,243 | 5/1976 | Mattioli et al. ..................... 528/500 |

FOREIGN PATENT DOCUMENTS

| 891480 | 1/1972 | Canada ................................ 203/36 |
| 2503619 | 8/1976 | Fed. Rep. of Germany . |
| 233716 | 4/1977 | France . |
| 880113 | 10/1961 | United Kingdom . |
| 1039169 | 9/1966 | United Kingdom . |
| 1275670 | 5/1972 | United Kingdom . |

Primary Examiner—Peter A. Hruskoci
Attorney, Agent, or Firm—Cushman, Darby & Cushman

[57] ABSTRACT

A process of recovering organic solvent from a liquid waste product which waste product is heat convertible by the steps of:
  (a) dispersing the liquid waste product in particulate form in water, in the presence of a bentonite or hectorite clay;
  (b) heating the dispersion to boiling point to strip off steam and organic solvent vapor;
  (c) condensing the evolved steam and orgnic vapor and separating the water therfrom; and
  (d) recovering the residue as an aqueous free-flowing slurry of solid granule particles.

4 Claims, No Drawings

SOLVENT RECOVERY PROCESS

This application is a c-i-p of Ser. No.176,760, Aug. 11, 1980, abandoned.

This invention relates to a process of recovering organic solvents from liquid waste products comprising such solvents in which polymeric materials are dispersed or dissolved.

The chemical processing industry accumulates each year large tonnages of liquid waste products which are basically solutions or dispersions of polymer in organic solvent. We use the word "solvent" herein in the context in which it is commonly understood in the paint, adhesive and allied industries; that is, a relatively volatile organic liquid which has the property of dissolving other less volatile organic compounds, especially film-forming polymers and resins.

These liquid waste products are not normally useable in their existing form, but their disposal by dumping or incineration is ecologically unacceptable and is rapidly becoming an option denied by legislation. Destructive disposal methods are wasteful of chemical resources, the solvent content in particular being a potentially valuable asset if it can be recovered economically.

Conventional recovery processes such as the recovery of volatiles by direct distillation are only a partial answer to the problem. The efficiency of release of volatiles from the non-volatile components may fall well short of theoretical and a typical endproduct in the still is a tarry residue which has no intrinsic value, but the removal of which can be a difficult and expensive exercise. One method of dealing with this is mixing a sufficient quantity of inert material with a residue to produce a pelletable mixture—this is advocated by Sussmeyer in a wideranging review (Congress Book of the XVth FATIPEC Congress, 3E-Activities, Vol.I, 1-52).

A more elegant method of achieving a finely divided innocuous residue is described in U.S. Pat. No. 3,929,586 of Slikkers. Slikkers wished to recover solvent from sludges which were produced by the washing of paint- and resin-making equipment, and he achieved this by distilling a mixture of solvent-containing waste sludge, water and a source of alkali or alkaline earth metal ion, the pH of the mixture being greater than 7 (preferably greater than 12). The resultant residue is stated to be a particulate residue which does not adhere to distillation vessel walls and which can be disposed of in landfills. The preferred sources of alkali and alkaline earth metal ions are the hydroxides of sodium, potassium, magnesium and calcium, the last-named being especially preferred. Slikkers believes that the metal ion reacts with the sludge, breaking it up and releasing more solvent than was previously the case and that the particles of residue are prevented from sticking together by a coating of inorganic material on their surfaces.

The method of Slikkers is not, however, without its drawbacks. The method is effective if the solids content of the sludge to be treated is relatively low—the highest solids content contemplated by Slikkers in his examples is 10% by weight with several examples having only 1%. Such solids contents are typical for washings but there are many industrial residues with solids contents as high as 60% by weight. When used on such residues, the Slikkers method can often be completely ineffective. A further deficiency is that the residue particles still contain an appreciable quantity of solvent.

I have now discovered a process which can be used to treat certain classes of waste at solids contents which are much higher than those contemplated by Slikkers and which can recover therefrom a larger proportion of solvent. The wastes to which my method is applicable are "heat convertible" by which I mean that when they are subjected to a temperature of 100° C. for 60 minutes under the test conditions described hereinunder, they yield a solid residue which is insoluble at 25° C. in acetone. The wastes can be treated without regard to solids content and the final product is a free-flowing slurry in water of solid granular particles which contain no solvent. I provide, according to the present invention, a process of recovering organic solvent from a liquid waste product which waste product is heat convertible by the steps of:

(a) dispersing the liquid waste product in particulate form in water;
(b) heating the dispersion to boiling point to strip off steam and organic solvent vapour;
(c) condensing the evolved steam and organic vapour and separating the water therefrom; and
(d) recovering the residue as an aqueous free-flowing slurry of solid granule particles characterised in that a film of the liquid waste not more than 2 mm thick when heated in air at 100° C. for 60 minutes yields a residue insoluble in acetone and in that the dispersion of the liquid waste product is carried out in the presence of a suspending agent.

Optionally the water can be evaporated from the slurry to give a residue of dry, solid particles. The organic solvent can also be further refined by conventional means, for example by fractional distillation, when it contains a mixture of solvents.

I determine whether a material is suitable for use in my process in the following manner. The liquid waste product to be tested is poured or spread on a horizontal test place, e.g. a sheet of glass or a flat steel panel, so that a film of up to 1–2 mm thick is formed thereon. The test plate is then heated in air to 100° C. and held at that temperature for 60 mins. It is cooled to 25° C. and then moistened with droplets of acetone. If the required degree of heat convertibility has been achieved, the residue on the test plate will not dissolve in the acetone. The effect of the acetone is sometimes more readily assessed by gently rubbing the moistened residue with a glass test probe. The appearance of a satisfactory test area will vary somewhat depending on the actual composition of the liquid waste. For example, a satisfactory material may not be entirely unaffected by acetone. When moistened and rubbed with the probe, it may lose adhesion to the substrate or even break up into irregular lumps or flakes. In extreme cases it may even show some wrinkling or swelling, but no dissolution. However, an unsatisfactory test sample will show definite evidence of dissolution in the acetone, notably a streaking or smearing on the test probe or substrate and an obvious loss of film integrity.

I associate the property of heat convertibility as measured by my acetone solubility test with the ability of the disperse particles of liquid waste to form solid, discrete particles during the steam stripping stage of my process. This gives rise to a slurry of granular particles which is readily discharged from the reaction vessel.

As I understand it, the heat convertibility is derived from cross-linking of polymeric components of the liquid waste. This characteristic may be inherent in the materials to be treated. For example, paint residues are a form of liquid waste to which my process is particularly well suited. One well-known class of paints, the "thermosetting" compositions, have the property of curing from a liquid to a solid form by a cross-linking chemical reaction between polymer components thereof. The cross-linking reaction can be initiated and controlled by well-known means, for example by the application of heat, a catalyst or a so-called cross-linking agent. Many mechanisms of this kind are known and are discussed in various authoritative texts such as "The Chemistry of Organic Film Formers" by D. H. Solomon (2nd Ed. (1977), Krieger Publishing Co., New York U.S.A.). When the liquid waste comprises such a thermosetting composition and the reaction conditions required to cause cross-linking to take place are present during the steam stripping cycle of my process, a satisfactory granular residue is produced.

The cross-linking reaction may require some acceleration other than by heat alone. For example, the above reference discloses other mechanisms, e.g. the addition to polymers of acid catalysts to achieve heat convertibility. The catalyst addition is made to the liquid waste before subjecting it to my abovedescribed cross-linking test. However, in carrying out the actual process the catalyst is not necessarily added to the liquid waste; it may alternatively be added to the dispersion of liquid waste in water, or to the water in which the dispersion is to be made provided this is consistent with the nature of the required cross-linking reaction.

Liquid wastes which cross-link in the presence of an acid catalyst include, for example, wastes comprising mixtures of hydroxylated acrylic polymers, e.g. copolymers of methyl methacrylate and hydroxyethyl methacrylate, and butylated melamine-formaldehyde resins. The added catalyst might then be, for example, p-toluene sulphonic acid or phosphoric acid.

I have observed that a surprising number of liquid waste products, including some which are normally acid catalysed, will pass my acetone solubility test for heat convertibility when made alkaline by the addition of an inorganic base selected from sodium and potassium hydroxides before they are tested. This insolubility in the presence of alkali metal hydroxides is an unusual and unexpected phenomenon; other workers in the field have suggested using alkali and alkaline earth metal hydroxides for various reasons in the recovery of solvents (Slikkers mentioned hereinabove is one example), but none have discovered this useful property of the two alkali metal hydroxides. It appears that such mixtures, especially when used in conjunction with an inorganic suspending agent, are particularly satisfactory materials for use in my process. They typically provide free-flowing slurries which show little, if any, tendency to leave solid deposits on the walls of the process equipment.

Alternatively, a liquid waste which is not inherently able to take part in a cross-linking reaction may be adapted to the requirements of my process by blending it with heat-convertible constituents. For example, thermoplastic lacquer comprising polymethyl methacrylate produces a residue soluble in acetone when subjected to my abovedescribed cross-linking test. However, the necessary heat-convertibility can be imparted to it by adding thereto sufficient carboxylated styrene-maleic anhydride copolymer, difunctional epoxy resin and tertiary amine catalyst.

A useful practical method of dealing with waste containing essentially thermoplastic polymer, is to blend that waste with a known heat convertible waste until a composition is reached which does satisfy my cross-linking test. The proportions to be blended depend on the compositions of the wastes to be treated and are readily determined by experiment.

The dispersion of the liquid waste in particulate form in water can be made, for example, by pouring the waste into water which is kept agitated by a mechanical stirrer. The water may be at ambient room temperature or preferably it may be heated to boiling before the liquid waste is added to it. Alternatively, if the water is heated by direct injection of steam, the agitation set up by the steam sparge may be sufficient to break the liquid waste up into discrete disperse particles.

I have found that, for the purposes of my invention, it is essential that a suspending agent be present. The suspending agent, which may be present in either the water or in the liquid waste may be chosen from the large number of such agents known to stabilise liquid dispersions in water; my process will tolerate most types of agent in common use. However, because the nature of the waste acceptable to this process can vary widely in composition and the dispersion must remain stable during the steam stripping cycle, some degree of trial may be necessary to determine the most suitable suspending agent for use with a particular liquid waste.

I have found that inorganic materials such as Wyoming bentonite and activated clays of the Hectorite type can be satisfactory suspending agents. Other suitable materials are, for example, an 85% hydrolysed grade of poly(vinyl acetate), gelatine, and amphipathic surface active agents e.g. triethanolamine oleate, sorbitol monostearate, lauryl alcohol ethoxylate and nonyl phenol ethoxylate. I use the word "amphipathic" in its artrecognised sense; that is, an amphipathic molecule is one having portions each of which has an affinity for a different phase of a multi-phase system. Anionic, cationic and non-ionic surfactants are thus amphipathic substances.

The required concentration of suspending agent varies with both the type of suspending agent used and the nature of the liquid waste being treated. With organic suspending agents a typical concentration is 2–5% based on the weight of liquid waste, while for inorganic suspending agents the corresponding figure is typically 5–10%. These quantities should, however be regarded only as guidelines and the type and quantity of suspending agent for use in a particular case are best ascertained by testing a small sample of waste.

The size of the disperse particles is not particularly critical in so far as the recovery process is concerned. Factors which influence the disperse particle size distribution in such systems are well known to the art and include, for example, the relative viscosities of each phase and the shear forces generated in the dispersion equipment. The nature and amount of solid material dissolved or dispersed in the liquid waste will, in turn, affect the viscosity of the disperse phase. If, for example, the solid constituents are polymeric and very viscous, the disperse particles tend to be coarser than when more fluid materials are used. Some agglomeration of primary particles may take place, but this is usually a reversible action and the final slurry remains free-flowing. In general, the finer the dispersion the more free-flowing the residue left in the process vessel after the steam stripping stage.

Typical dispersions I have used successfully in our process have differed quite markedly in average particle diameter, the extremities lying at about 0.1 μm and 5 mm.

The dispersion may be raised to boiling point by externally applied heat or, for example, by steam injected directly into the process vessel. The condensed mixture of steam and organic solvent vapour is treated by normal phase separation techniques to recover the organic solvent, less some losses of water-soluble fractions which will partition into the aqueous phase. As mentioned hereinabove, the organic solvent may be further refined, if desired by, for example, a further fractional distillation range.

The actual processing cycle is dependent on the choice of equipment and limiting factors such as the tendency of the dispersion to foam excessively if too-rapid processing is attempted and the desirability of producing a suitably solid, free-flowing residue. Typical cycle times are of the order of 40–90 minutes.

At the completion of the steam stripping cycle, the solid residue is discharged, preferably by gravity, from the process vessel. It can be readily dewatered by, for example, filtration. In its dewatered form, although still containing an appreciable quantity of water, the granular residue packs down to a firm mass and, subject to ruling environmental protection laws, is in a suitable form for disposal as solid fill. If desired, it may be completely dried.

The process is broadly applicable to a wide range of materials such as, for example, paint residues, adhesives and dispersions or solutions of polymers used as intermediates in the preparation of paints and adhesives. Care must be exercised, however in treating liquid wastes comprising materials which have a significant reactivity with water. A particularly useful feature of the process according to this invention is that it is applicable to wastes with high solids contents (in excess of 50% by weight). Although my process is applicable to appropriate wastes of any solids content, I prefer the solids content to be at least 20% by weight.

A further advantage is that, because the particles of waste are cross-linked, they become completely insoluble in any solvent, resulting in a very high yield of recovered solvent.

A further particularly useful feature of my process is that if the average particle diameter is held to the appropriate dimensions, the residue can be recycled as a filler in products such as, for example, surface coatings, putties, caulking compounds, fillers and adhesives. For this purpose the average particle diameter is preferably less than about 35 μm.

Dried residue, provided it is suitably chemically inert, is also potentially useful as a filler in moulded plastics ware.

The invention is illustrated by the following examples, in which all parts are expressed in weight.

EXAMPLE 1

Recovery of solvent from a liquid thermosetting acrylic enamel.

The enamel treated by the process comprised a hydroxylated acrylic polymer and a butylated melamine-formaldehyde resin. The material was inherently heat-convertible when catalysed by an acid.

A sample of the liquid waste, catalysed by the addition thereto of 1% by weight of 80% phosphoric acid, gave a residue insoluble in acetone when subjected to my test for heat convertibility.

| A mixture of: | |
|---|---|
| water | 900 parts |
| poly(vinyl alcohol)* solution | 300 parts |
| 80% phosphoric acid | 3 parts | was heated to boiling point in a still fitted with reflux condenser and water separator and 500 parts of the liquid waste added to it over a period of 30 min. Organic solvent was separated off from condensed distillate and the water fraction, which in the initial stage of the process, contained approximately 7% solvent in solution, was recycled to the batch. Steam stripping was continued for a further 90 min. at which time 95% by wt. of the solvent, as determined by analysis of the liquid waste charged to the process, had been collected. Distillation was stopped at that point.

The non-volatile residue consisted of hard, discrete particles with a maximum diameter of about 300 μm. A slurry of these particles in the water remaining in the still flowed readily when discharged.

EXAMPLE 2

Recovery of solvent from a liquid thermosetting alkyd enamel.

The enamel treated by the process comprised a hydroxylated coconut oil-modified alkyd resin and a butylated melamine-formaldehyde resin. The material was inherently heat-convertible when catalysed by an acid.

A sample of the liquid waste, catalysed by the addition thereto of 1% by weight of 80% phosphoric acid, gave a residue insoluble in acetone when subjected to my test for heat convertibility.

A steam jacketed reaction vessel fitted with a reflux condenser and water separator was charged with the following:

| | |
|---|---|
| water | 32 parts |
| poly(vinyl alcohol) solution (as example 1) | 8 parts |
| 80% phosphoric acid | 0.13 parts |
| liquid waste | 30 parts |

The charge was stirred mechanically and brought slowly to the boil, then held at reflux for 2.25 hr. Solvent was stripped off continuously and water from the reflux condensate re-cycled to the batch. The yield of solvent against the analysed content of the liquid waste was 95% by wt.

The residue in the reaction vessel was a free-flowing aqueous slurry of solid particulates with a maximum particle diameter of about 200 μm. The flash point of the slurry was higher than 61° C., compared with 26° for the original liquid residue. The Biological Oxygen Demand of a sample of the slurry was 10 p.p.m. The residue thus presented significantly less of a disposal problem than the original liquid waste.

EXAMPLE 3

Use of bentonite as a suspending agent in the recovery of solvent from a liquid thermosetting acrylic enamel.

The process of example 1 was repeated, but with the following substitutions made to the reactants. The water/poly(vinyl alcohol)/phosphoric acid mixture was replaced by a mixture of 1200 parts of water and 72 parts of Wyoming bentonite. The catalysed liquid waste passed our acetone test for heat convertibility.

The yield of organic solvent was 90% by wt. of the content estimated by analysis of the original liquid waste. The disperse particles of residue were of the order of 5–10 mm. diameter.

EXAMPLE 4

Use of Hectorite as a suspending agent in the recovery of solvent from a liquid thermosetting acrylic enamel.

Example 3 was repeated, but replacing the Wyoming bentonite of that example with an equal weight of a swellable synthetic clay (Hectorite) known by the trade name "Laponite".

The same weight of solvent was recovered and the disperse particles of residue had a mean diameter of approximately 200 μm.

EXAMPLE 5

The use of amphipathic organic suspending agents in the recovery of organic solvents from a liquid thermosetting acrylic enamel.

The enamel used in this example was the same as that used in example 1 but catalysed by dispersing therein 1% of p-toluene sulphonic acid. The catalysed liquid enamel gave a residue insoluble in acetone when tested by my test for heat convertibility.

A charge of 1200 parts of water was added to a still fitted with a reflux condenser and water separator, then heated to boiling point. A mixture of:

| liquid thermosetting acrylic enamel (as example 1) | 500 parts |
|---|---|
| p-toluene sulphonic acid | 5 parts |
| sorbitan monopalmitate/ polyoxy ethylene (20 units) | 1.5 parts |
| sorbitan monostearate | 1.5 parts | was added to the boiling water and stream stripping as generally described in example 1 continued for 90 mins. A yield against analysis of 95% by weight was recorded. The discrete particles of residue were somewhat fibrous in nature with an average length of about 5 mm.

EXAMPLE 6

Recovery of solvent from a liquid thermoplastic acrylic lacquer.

The lacquer used in this example was essentially a pigmented solution in organic solvents of a poly(methyl methacrylate), which under the conditions of my test for heat convertibility gave a residue which was readily solvated by acetone.

To 600 parts of the liquid waste was added 14.4 parts of a styrene-maleic copolymer as used in example 3, (S.M.A. 1000 ex Arco Corp., U.S.A.) 32.4 parts of a liquid epoxy resin ("Epikote" 828 ex Shell Chemicals) and 0.5 parts of a tertiary amine ("Armeen" DMCD ex Armor-Hess Corp., U.S.A.), dissolved in 40 parts of a 30:10 (by weight) mixture of toluene and acetone.

A sample of the liquid waste so modified gave a residue insoluble in acetone when subjected to my test for heat convertibility.

The 600 parts of modified liquid waste was added over a period of 30 min. to the following mixture held at boiling point in a still fitted with reflux condenser and water separator.

| water | 900 parts |
|---|---|
| poly(vinyl alcohol) solution as example 1 | 300 parts |
| sodium carbonate, anhydrous | 6 parts |

Steam stripping and re-cycling of aqueous condensate was continued for a further 90 min. to give a yield of solvent, based on analysis of the liquid waste, of 95%.

The solid residue was in the form of friable, gritty aggregates with an average diameter of about 5 mm.

EXAMPLE 7

Recovery of organic solvent from a mixed thermoplastic/thermosetting paint system.

A thermosetting acrylic lacquer as used in example 1 was added to a thermoplastic acrylic lacquer as used in example 6 until the blend, when catalysed by the addition of 1% by weight of 80% phosphoric acid, gave a residue insoluble in acetone, when subject to my test for heat convertibility.

By the general method of example 1, that blend as tested was steam stripped to yield about 90% by weight of the available organic solvent.

The solid residue consisted of coarse, friable crumbs with average diameters of the order of 1–10 mm.

EXAMPLE 8

Recovery of organic solvent from a thermosetting acrylic lacquer using steam injection.

The liquid waste used in this example comprised a copolymer of styrene and hydroxypropyl methacrylate and a butylated melamine-formaldehyde resin. When catalysed by the addition thereto of 1% by weight of 80% phosphoric acid and subjected to our heat convertibility test, the liquid waste yielded a solid residue insoluble in acetone.

| A mixture of: | |
|---|---|
| water | 400 parts |
| poly(vinyl alcohol) solution as example 1 | 180 parts |
| 80% phosphoric acid | 3 parts | was loaded into a still fitted with a reflux condenser and water separator. Steam was injected into the batch, which reached boiling point in 1 hr. The steam injection was continued and 540 parts of liquid waste added to the batch at a uniform rate over a period of 1 hr. Aqueous condensate was re-cycled continuously to the batch during the steam stripping, which continued for a further 2½ hr. The recovery of organic solvent corresponded to 99% by weight of theoretical. The residue discharged from the still was an aqueous slurry of friable aggregates of solid particles. The aggregates had diameters of up to 1 cm.

EXAMPLE 9

Recovery of organic solvent from an air-drying enamel.

The waste liquid of this example was a solution in mineral spirits of an air-drying oil-modified alkyd resin pigmented with aluminium powder. The polymeric alkyd resin did not give a solid residue insoluble in acetone, when subjected to my heat convertibility test. When subjected to the process as described in example 1, organic solvent was recoverable from the waste liquid but a glutinous mass, difficult to remove from the still, formed before the theoretical yield of organic solvent was realised.

The waste liquid was then blended with increments of the thermosetting acrylic enamel used in example 1 (catalysed with the corresponding amount of 80% phosphoric acid) until under the conditions of our test a solid, acetone-insoluble residue was obtained. The acceptable blend contained approximately equal parts by weight of the two liquids.

This blend, when subjected to the process described in example 1, yielded about 90% of the theoretical content of organic solvent and a slurry of crumbly, but somewhat soft, disperse particles, loosely aggregated into secondary particles of mean diameter up to 1–2 cm. The slurry discharged readily from the still.

EXAMPLE 10

Recovery of organic solvent from a mixed thermoplastic/thermosetting paint system.

A thermosetting acrylic lacquer (comprising a hydroxylated acrylic polymer and a butylated melamine-formaldehyde resin) and a thermoplastic acrylic lacquer (a pigmented solution of poly(methyl methacrylate) were mixed in the weight ratio of 1:1. After addition of 1% by weight of sodium hydroxide (in the form of a solution in ethanol, this mixture gave a residue which was essentially insoluble in acetone when subjected to my test for heat convertibility.

| A mixture of | |
|---|---|
| water | 1200 parts |
| sodium bentonite | 15 parts |
| sodium hydroxide | 6 parts | was heated to boiling in a still fitted with a stirrer, reflux condenser and water separator and 600 parts of the 1:1 liquid waste mixture previously described was added thereto over a period of 30 minutes. Organic solvent was separated off from the condensed distillate and the water fraction, which in the initial stage of the process contained approximately 7% solvent in solution, was recycled to the batch. Steam stripping was continued for a further 3 hours at which time 98% by weight of the solvent present in the waste as determined by analysis had been collected. Distillation was stopped at that point.

The non-volatile residue consisted of hard discrete particles with a maximum diameter of 6 mm. A slurry of these particles in the water remaining in the still flowed readily when discharged.

EXAMPLE 11

Use of vermiculite as a suspending agent in the recovery of solvent from a mixed thermoplastic/thermosetting paint system.

Example 10 was repeated but replacing the sodium bentonite of that example with an equal weight of vermiculite, the particled size of which was such that 10% was retained on a 52 mesh BSS sieve and 70% maximum on a 100 mesh BSS sieve.

The same weight of solvent was recovered and the solid particles had a mean diameter of approximately 5 mm.

EXAMPLE 12

A comparison of the process according to the invention with a known process.

The waste material was an epoxy resin-based paint with solids content 53% by weight. This was treated by two methods:

(a) the method according to the present invention; and (b) the method according to U.S. Pat. No. 3,929,586.

(a) Method according to the present invention

The epoxy paint was mixed with an equal quantity of a melamine-formaldehyde resin/acrylic resin mixture (55% solids by weight). This mixture gave a residue which was insoluble in acetone when subjected to my test for heat convertibility.

| A mixture of | |
|---|---|
| water | 1200 parts |
| sodium bentonite | 15 parts |
| sodium hydroxide | 6 parts | was heated to boiling in a still fitted with a stirrer, reflux condenser and water separator and 600 parts of the epoxy-melamine formaldehyde resin-acrylic mixture described hereinabove were added thereto over a period of 30 minutes. Organic solvent was separated off from the condensed distillate and the water fraction returned to the still for further distillation. After 3 hours of steam stripping, 98% by weight of the solvent present had been recovered and the residue comprised a free flowing aqueous slurry of hard discrete particles of maximum diameter 2 mm.

(b) Example 1 of U.S. Pat. No. 3,939,586 was carried out using the abovementioned epoxy paint. The mixture of paint and calcium hydroxide was added to the boiling water as specified but it was found that the epoxy resin came out of solution and adhered to the agitator and the walls of the still from which removal was difficult and time-consuming.

I claim:

1. A process of recovering organic solvent from a liquid waste product comprising an organic solvent in which polymeric material is dispersed or dissolved which waste product is heat convertible by the steps of (a) dispersing the liquid waste product in particulate form in water in the presence of an effective amount of an inorganic suspending agent to prevent agglomeration of said waste product, said suspending agent selected from the group consisting of bentonite, and activated clays of the hectorite type;

(b) heating the dispersion to boiling point to strip off steam and organic solvent vapour;

(c) condensing the evolved steam and organic vapour and separating the water therefrom; and (d) recovering the residue as an aqueous freeflowing slurry of solid granule particles, said liquid waste product being further characterised in that a film of the liquid waste not more than 2 mm thick when heated in air at 100° C. for 60 minutes yields a residue insoluble in acetone.

2. A process according to claim 1 wherein prior to treatment, the waste product is made alkaline with a base selected from sodium hydroxide and potassium hydroxide.

3. A process according to claim 1 wherein the waste material is epoxy resin-based paint, and the suspending agent is sodium bentonite, the waste product having been made alkaline with sodium hydroxide.

4. A process according to claim 1 wherein the suspending agent is present in the amount of about 5–10% based on the weight of the liquid waste.

* * * * *